United States Patent [19]
Chae

[11] Patent Number: 5,641,957
[45] Date of Patent: Jun. 24, 1997

[54] INCLINATION ANGLE SENSING APPARATUS FOR USE IN A PROJECTOR

[75] Inventor: Song Chae, Seoul, Rep. of Korea

[73] Assignee: Daewoo Electronics Co., Ltd., Seoul, Rep. of Korea

[21] Appl. No.: 557,655

[22] Filed: Nov. 13, 1995

[30] Foreign Application Priority Data

Nov. 11, 1994 [KR] Rep. of Korea ............... 94-29854

[51] Int. Cl.$^6$ .................... G01D 5/34; G03B 21/00
[52] U.S. Cl. .................... 250/231.14; 353/70
[58] Field of Search .................... 250/231.14; 356/138, 356/139.01; 353/69, 70, 79

[56] References Cited

U.S. PATENT DOCUMENTS

| | | | |
|---|---|---|---|
| 4,092,064 | 5/1978 | Puel | 353/79 |
| 4,922,620 | 5/1990 | Terragni | 250/231.14 |
| 4,974,958 | 12/1990 | Yoshida | 353/69 |

*Primary Examiner*—Edward P. Westin
*Assistant Examiner*—Kevin Pyo
*Attorney, Agent, or Firm*—Anderson Kill & Olick PC

[57] ABSTRACT

An inclination angle sensing apparatus for use in a projector includes a plurality of inclination angle sensing devices, each of the inclination angle sensing devices having a moving member, an elastic means, a rack, an idle gear, a sensor pinion, a pair of fixing members, a circuit substrate and an optical sensing unit. In the inclination angle sensing device, the moving member is coupled to the rack and the sensor pinion is engaged with the rack. The sensor pinion has a reflector consisting of a light transmitting and a light reflecting portions, and the optical sensing unit has a portion for emitting a light beam to the reflector on the sensor pinion and a portion for receiving the light beam therefrom. The optical sensing unit determines the amount of rotation the sensor pinion has undergone by the receiving portion thereof counting the number of times the light beam encounters the light transmitting or the light reflecting slices of the sensor pinions during the rotation.

3 Claims, 4 Drawing Sheets

INCLINATION ANGLE SENSING APPARATUS FOR USE IN A PROJECTOR

FIELD OF THE INVENTION

The present invention relates to a projector; and, more particularly, to an apparatus for use therein capable of sensing automatically an inclination angle of the projector with respect to a plane on which the projector is set.

DESCRIPTION OF THE PRIOR ART

In general, an image from a projector can be made distortionless on a screen by positioning the projector in such a manner that the optical axis of the projection lens of the projector is perpendicular to the screen. However, except for cases where the projector is installed more or less permanently, the projector, and hence the optical axis of the projection lens thereof, is usually set on a plane in such a way that there exists an angle of inclination between the optical axis and the plane. In other words, it is more likely that the optical axis of the projection lens of the projector may not be perpendicular to the screen, thus giving rise to a distortion in the image formed thereon.

FIGS. 1A and 1B illustrate an ideally set projector and a slantly set projector, respectively, wherein the optical axis 4 of the projection lens 3 of the projector 2 in the former case is perpendicular to the screen 5 and that in the latter case is not perpendicular to the screen 5; and FIG. 2 shows the images projected on the screen 5 for the respective cases.

When the optical axis 4 of the projection lens 3 of the projector 2 is perpendicular to the screen 5, as shown in FIG. 1A, a distortionless image 6 is obtained as shown by a solid line in FIG. 2. However, when the projector 2 is slantly set, i.e., the projector 2 is set up with an angle of inclination $\theta$ with respect to the plane 1 on which the projector 2 is set, as shown in FIG. 1B, the image 7 projected on the screen 5 is distorted due to the inclination by the angle $\theta$, which is shown by a broken line in FIG. 2.

There is disclosed in Japanese Patent Laid-Open Publication No. 4-323979 (Nov. 13, 1992) a circuit for correcting the image distortion arising from an inclination. However, in this case, the user is required to correct the distorted image while directly watching it on the screen.

SUMMARY OF THE INVENTION

It is, therefore, a primary object of the present invention to provide an apparatus for use in a projector capable of automatically sensing an angle of inclination $\theta$ of the projector with respect to a plane on which the projector is set.

In accordance with one aspect of the present invention, there is provided an apparatus for use in a projector capable of automatically sensing an angle of inclination of the projector with respect to a plane on which the projector is set, the apparatus being located on a bottom portion of the projector, the apparatus further including a plurality of inclination angle sensing devices, the projector being provided with an identical number of inserting holes and guiding means as the inclination angle sensing devices, each of the inserting holes being located on a bottom surface of the projector, each of the guiding means extending upward from each of the inserting holes, wherein each of the inclination angle sensing devices comprises: a moving member having a top and a bottom ends and including a connecting means, wherein the moving member is inserted into one of the inserting holes in such a way that the moving member is guided by the corresponding guiding means and moves vertically, and the bottom end of the moving member is in contact with the plane; an elastic means vertically fixed between the guiding means and the connecting means of the moving member, in such a way that the elastic means allows the moving member to revert back to an initial position when the projector is lifted off from the plane by providing an elastic force necessary for such a movement; a rack coupled to the top end of the moving member; an idle gear having a first shaft, the idle gear being engaged with the rack; a sensor pinion engaged with the rack in such a way that the sensor pinion is allowed to rotate when the rack coupled to the moving member moves vertically, the sensor pinion further having a reflector and a second shaft, wherein the reflector consists of an equal number of equal sized light transmitting and light reflecting slices; a pair of fixing members, the pair of the fixing members protruding from a vertical member, the vertical member being perpendicular to the bottom surface of the projector, each of the fixing members having an inside and an outside surfaces and a pair of holes, wherein the holes are used for fitting the first and the second shafts of the respective idle gear and sensor pinion; a circuit substrate attached to one of the inside surfaces of the fixing members; an optical sensing unit located on the circuit substrate, the optical sensing unit further having a portion for emitting a light beam to the sensor pinion and a portion for receiving the light beam therefrom, wherein the optical sensing unit determines the amount of rotation the sensor pinion has undergone by the receiving portion thereof counting the number of times the light beam encounters the light transmitting or the light reflecting slices of the sensor pinions during the rotation.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1A:
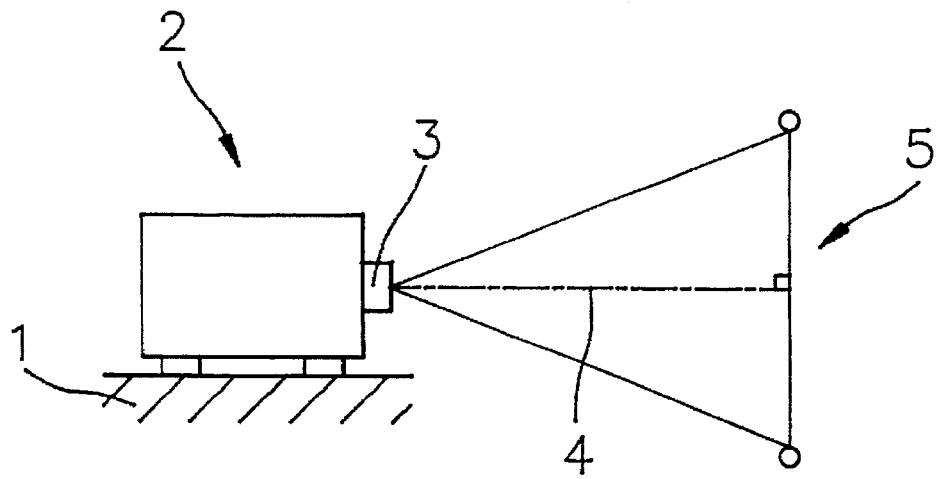
FIGS. 1A and 1B show an ideally set projector and an slantly set projector, respectively.
Figure 1B:
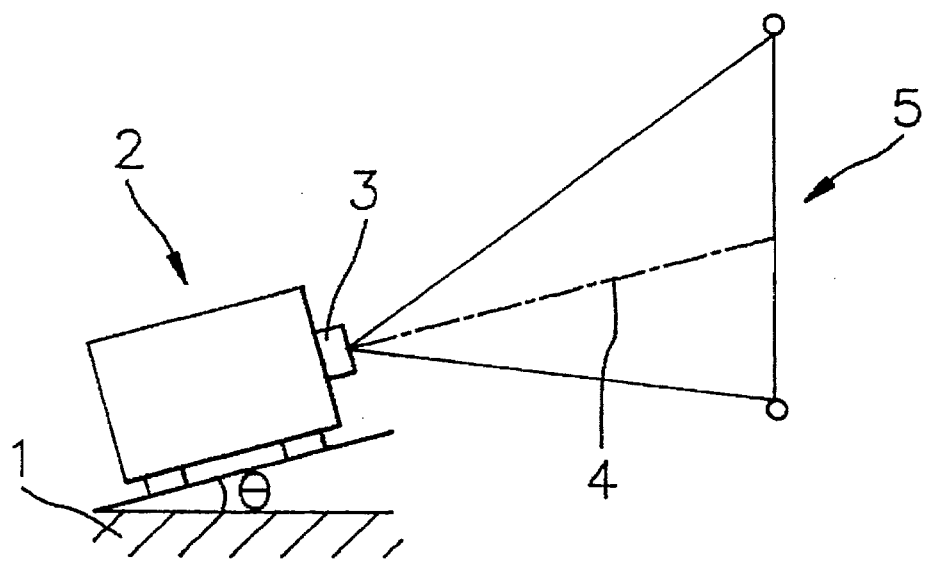
Figure 2:
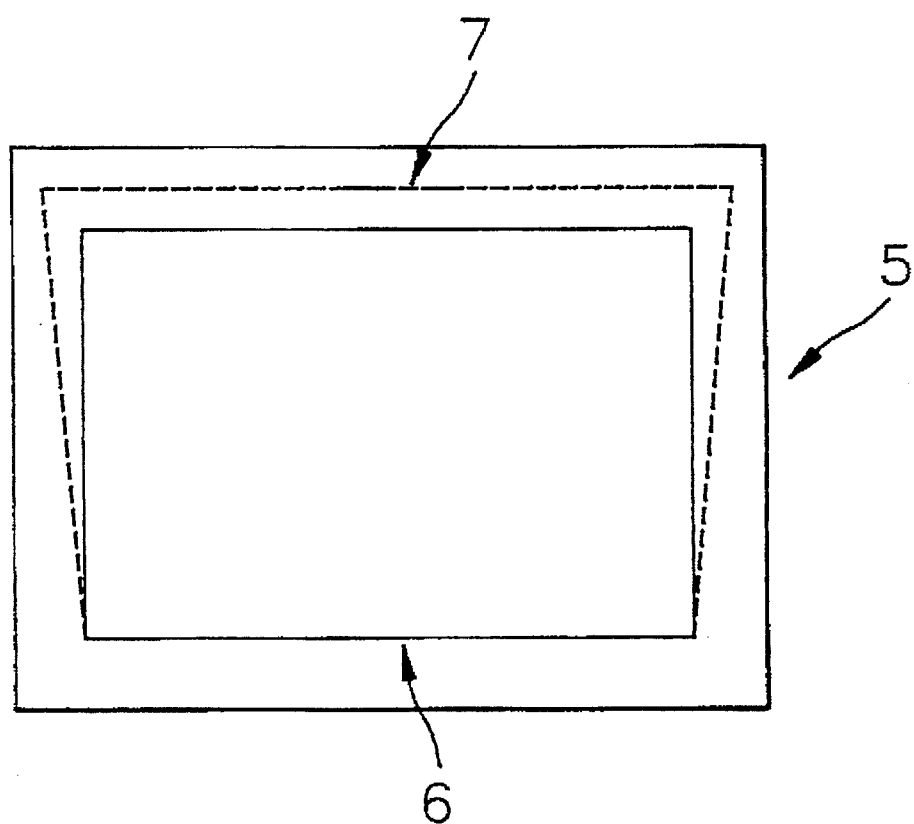
FIG. 2 presents the images projected on the screen from the ideally set projector and the slantly set projector, respectively.
Figure 3:
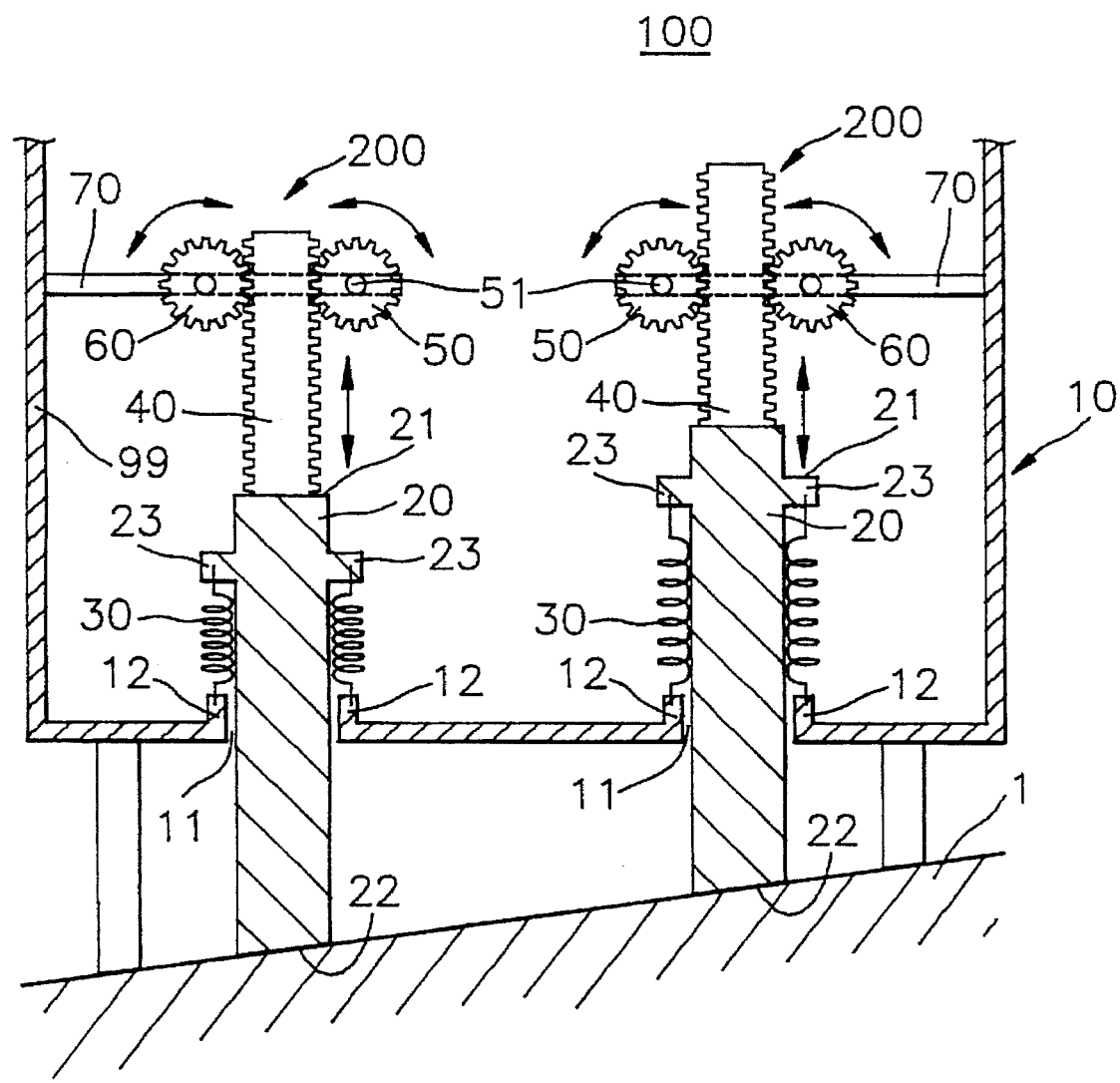
FIG. 3 represents a cross sectional view of an inclination angle sensing apparatus in accordance with the present invention when a projector is slantly installed.

There is shown in FIG. 3 a cross sectional view of an inventive apparatus 100 capable of sensing automatically an inclination angle when the projector 10 is slantly installed.

The apparatus 100 is located on a bottom portion of the projector 10, and includes a plurality of inclination angle sensing devices 200. The projector 10 is provided with an identical number of inserting holes 11 and guiding means 12 as the inclination angle sensing devices 200, wherein each of the inserting holes 11 is located on a bottom surface of the projector 10 and each of the guiding means 12 extends upward from each of the inserting holes 11.

For the sake of simplicity, a detailed description of the apparatus 100 will be given with respect to a single inclination angle device 200.

Figure 5:
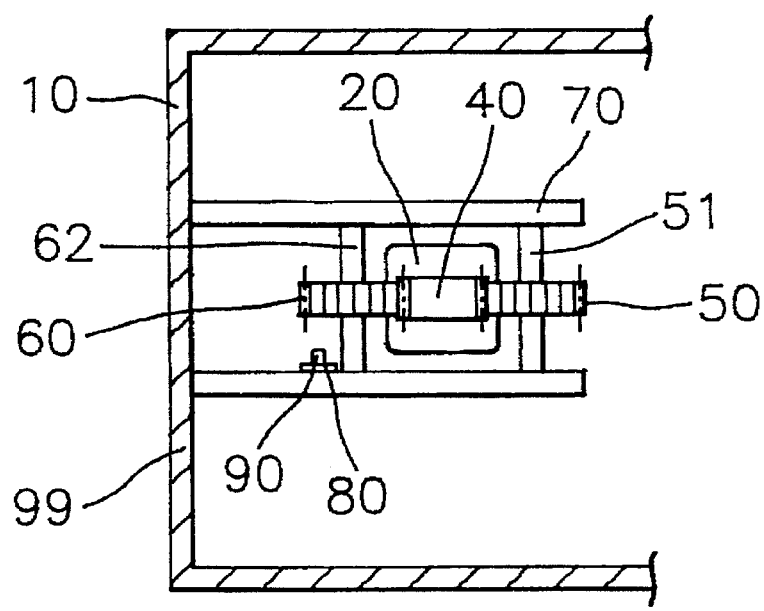
FIG. 5 illustrates a partial top view showing how the sensor pinion and the idle gear are engaged to a rack in the inclination angle sensing apparatus.

In the inventive apparatus 100, each of the inclination angle sensing devices 200 comprises a moving member 20, an elastic means 30, a rack 40, an idle gear 50, a sensor pinion 60, a pair of fixing members 70, a circuit substrate 80 (see FIG. 5) and an optical sensor unit 90 (see FIG. 5).

The moving member 20 is provided with a top and a bottom ends 21, 22, and includes a connecting means 23. The moving member 20 is inserted into one of the inserting holes 11 in such a way that the moving member 20 is guided by the guiding means 12 to move vertically, and the bottom end 22 thereof is in contact with the plane 1.

The elastic means 30, e.g. a spring, is vertically fixed between the guiding means 12 and the connecting means 23 of the moving members 20, in such a way that the elastic means 30 allows the moving member 20 to move back to an initial position when the projector 10 is lifted off from the plane 1 by providing an elastic force necessary for such a movement, the initial position being the position of the moving member 20 before the projector 10 was set on the plane 1.

The rack 40 is coupled to the top end 21 of the moving member 20, and the idle gear 50 for balancing the rack 40 has a first shaft 51 and is engaged with rack 40.

The sensor pinion 60 is engaged with the racks 40 in such a way that the sensor pinion 60 is allowed to rotate when the rack 40 coupled to the moving member 20 moves vertically.

Figure 4:
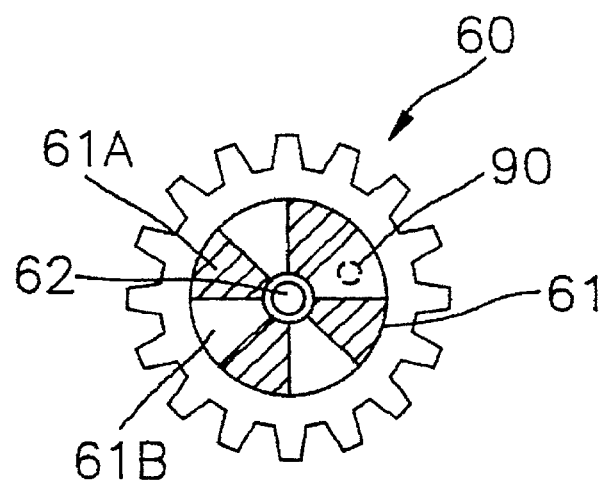
FIG. 4 offers a detailed view of a sensor pinion of the inventive inclination angle sensing apparatus.

Furthermore, as shown in FIG. 4, the sensor pinion 60 has a reflector 61 and a second shaft 62. The reflector 61 is divided into an even number of equal sized slices, one half of the slices forming a light transmitting portion 61A and the remaining half forming a light reflecting portion 61B. Each of the slices that forms a part of the light transmitting portion 61A has, as its immediate neighbors, two slices that form a part of the light reflecting portion 61B, and vice versa.

As shown in FIG. 5, the pair of fixing members 70 is protruding from a vertical member 99, the vertical member 99 being perpendicular to the bottom surface of the projector 10.

Each of the fixing members 70 has an inside and an outside surfaces and a pair of holes (not shown), wherein the holes are used for fitting the first and the second shafts 51, 62 of the respective idle gear 50 and sensor pinion 60. The vertical member 99 may be a side surface of the projector 10 or a side surface of a casing (not shown) encasing the apparatus 100.

The circuit substrate 80 is attached to one of the inside surfaces of the fixing members 70 in the pair.

The optical sensor unit 90 is located on the circuit substrates 80. Furthermore, the optical sensor unit 90 has a portion (not shown) for emitting a light beam to the reflector 61 on the sensor pinions 60 and a portion (not shown) for receiving the light beam from the reflector 61 of the sensor pinion 60.

The operating principles of the inventive inclination angle sensing apparatus 100 will now be described in detail.

When the projector 10 having the inclination angle sensing apparatus 100 is ideally set on the plane 1, each of the moving members 20 experiences an equal physical force. However, as shown in FIG. 3, when the projector 10 is slantly set with respect to the plane 1, each of the moving members 20 experiences a different physical force, thus giving rise to a difference in the distance that each of the moving members 20 is allowed to move. Accordingly, each of the racks 40 coupled to the top end 21 of each of the moving members 20 moves a different distance and hence each sensor pinions 60 engaged with one of the racks 40 rotates by a different amount.

The light emitting portion in each of the optical sensor units 90 emits a light beam toward the respective sensor pinion 60 and the receiving portion thereof receives the light beam therefrom.

The amount of rotation each of the sensor pinions 60 undergone is determined by the receiving portion of the optical sensor unit 90 counting the number of times the light beam encounters the light transmitting portions 61A or the light reflecting portions 61B of the sensor pinion 60 during the rotation to thereby find out the inclination angle of the projector.

The inclination angle so determined is then sent by each of the circuit substrates to a circuit for correcting the image distortion similar to, for example, the one disclosed in Japanese Patent Laid-Often Publication No. 6-189236 (Jul. 8, 1994.).

Although the invention has been shown and described with respect to the preferred embodiments, it will be apparent to those skilled in the art that various changes and modifications may be made without departing from the scope of the invention as defined in the following claims.

What is claimed is:

1. An apparatus for use in a projector capable of automatically sensing an angle of inclination of the projector with respect to a plane on which the projector is set, the apparatus being located on a bottom portion of the projector, the apparatus further including a plurality of inclination angle sensing devices, the projector being provided with an identical number of inserting holes and guiding means as the inclination angle sensing devices, each of the inserting holes being located on a bottom surface of the projector, each of the guiding means extending upward from each of the inserting holes, wherein each of the inclination angle sensing devices comprises:

a moving member having a top and a bottom ends and including a connecting means, wherein the moving member is inserted into one of the inserting holes in such a way that the moving member is guided by the corresponding guiding means and moves vertically, and the bottom end of the moving member is in contact with the plane;

an elastic means vertically fixed between the guiding means and the connecting means of the moving member, in such a way that the elastic means allows the moving member to revert back to an initial position when the projector is lifted off from the plane by providing an elastic force necessary for such a movement;

a rack coupled to the top end of the moving member;

an idle gear having a first shaft, the idle gear being engaged with the rack;

a sensor pinion engaged with the rack in such a way that the sensor pinion is allowed to rotate when the rack coupled to the moving member moves vertically, the sensor pinion further having a reflector and a second shaft, wherein the reflector consists of an equal number of equal sized light transmitting and light reflecting slices;

a pair of fixing members, the pair of the fixing members protruding from a vertical member, the vertical member being perpendicular to the bottom surface of the projector, each of the fixing members having an inside and an outside surfaces and a pair of holes, wherein the holes are used for fitting the first and the second shafts of the respective idle gear and sensor pinion;

a circuit substrate attached to one of the inside surfaces of the fixing members;

an optical sensing unit located on the circuit substrate, the optical sensing unit further having a portion for emitting a light beam to the sensor pinion and a portion for receiving the light beam therefrom, wherein the optical sensing unit determines the amount of rotation the sensor pinion has undergone by the receiving portion thereof counting the number of times the light beam encounters the light transmitting or the light reflecting slices of the sensor pinions during the rotation to find out the inclination angle.

2. The apparatus of claim 1, wherein each of the light transmitting slices has, as its immediate neighbors, two light reflecting slices, and vice versa.

3. The apparatus of claim 1, wherein the elastic means is a spring.

* * * * *